United States Patent [19]
Hetzel

[11] 3,806,743
[45] Apr. 23, 1974

[54] OSCILLATING HAROLOGICAL MOTOR
[75] Inventor: Max Hetzel, Bienne, Switzerland
[73] Assignee: Omega Louis Brandt Freres, S.A., Bienne, Switzerland
[22] Filed: Dec. 18, 1972
[21] Appl. No.: 315,902

Related U.S. Application Data
[63] Continuation of Ser. No. 109,507, Jan. 25, 1971.

[30] Foreign Application Priority Data
Feb. 9, 1970  Switzerland........................ 1789/70

[52] U.S. Cl......................... 310/36, 318/132, 58/23
[51] Int. Cl. ............................................. H02k 33/00
[58] Field of Search ................................ 310/36–39; 318/128–132; 58/23 V, 23 H

[56] References Cited
UNITED STATES PATENTS
3,518,515  6/1970  Reich................................... 318/128
3,424,578  1/1969  Strnat et al. .......................... 75/213
3,046,460  7/1962  Zemla.................................. 318/132
3,095,528  6/1963  Dome ................................. 318/132
3,328,657  6/1967  Hetzel................................. 318/128

Primary Examiner—D. F. Duggan
Attorney, Agent, or Firm—Imirie & Smiley

[57] ABSTRACT

An electro-dynamic vibratory motor for time-measuring purposes, particularly for sustaining the oscillation of a tuning fork or other frequency standard in a watch, wherein a magnetic yoke embraces a coil and at least one flat permanent magnet composed of elements of the group of rare earths and cobalt is fixed to at least one surface of said yoke facing said coil.

10 Claims, 3 Drawing Figures

PATENTED APR 23 1974 3,806,743

INVENTOR
MAX HETZEL
BY
Imirie & Smiley
Attys.

OSCILLATING HAROLOGICAL MOTOR

This is a continuation, of U.S. Pat. application Ser. No. 109,507, filed Jan. 25, 1971.

The invention relates to electric motors for use in the field of chronometer technique, in which a coil and a magnetic system which is provided with at least one permanent magnet, are arranged so as to be displaceable relative to each other, the lines of force of the permanent magnet intersecting the windings of the coil substantially at right angles to the direction of movement.

It is known that the forces and torques arising in such motors depend not only upon the magnitude of the current in the coil, but also upon the magnetic field strength of the permanent magnet and the magnetic induction between it and the coil. In chronometer technology electric motors usually have a low electric input and should produce relatively large forces. More especially in minature electric watches the mechanical force, speed and the working voltage of the electric motor are determined by the construction of the gear train to be driven and by the battery the construction of which in turn depends on other overriding requirements.

Consequently considerable importance is attached both to the construction of the coil and the magnetic system of a motor for use in the field of chronometer technology, since a high degree of efficiency is an essential condition. The magnetic system should embrace the windings of the coil substantially completely and closely, so that the flux linkage with the coil and the magnetic induction in this region are substantial. This condition necessitates as accurate as possible an adaptation of the magnetic material to the shape of the coil. Unfortunately permanent magnet materials having a high coercive force are difficult to shape, so that the adaptation of the magnetic system to the shape of the coil has hitherto been involved and costly. For the rigorous requirement which always prevail in chronometer technology, a platinum-cobalt alloy has proved particularly advantageous; it is marketed under the trade name "Platinex." Since, however, magnetic materials of this kind are very costly, chip removing or shaping to any great extent is out of question for economic reasons. The magnetic system of a chronometer motor has therefore hitherto be defined within quite close limits by the properties of the materials available.

On the other hand, the coil of the electric motor for a chronometer has been the object of maximum refinement, which, however, is also costly. The material cost of the conductors and insulation in the field of application referred to are not economically of great importance. As the wire used decreases in gauge, however, production cost rise considerably. In addition the designer, especially for miniature watches, has technological and economic limits.

The object of the present invention is to provide on an electric motor, more especially for use in the field of chronometer technology which, with a relatively low electric input has a high degree of efficiency and produces a relatively large force. It may be produced cheaply, with simple means.

According to the present invention there is provided an electro-dynamic motor for use in the field of chronometer technology, comprises a coil and a magnetic system provided with at least one permanent magnet which are located so as to be movable relative to one another and the lines of force of the permanent magnet intersect the coil at right angles to the direction of the said movement, wherein the magnetic system has a flat magnet which is composed of elements of the group of rare earths, and cobalt.

Preferably the flat magnet is composed of an alloy of samarium and cobalt. An alloy of one mol part samarium and five mol parts cobalt has been proved particularly effective.

Besides selection of magnet material the invention also concerns a specific construction wherein the magnetic system consists of a yoke of U-shaped cross-section of ferro-magnetic material and at least one flat magnet which is located on one of two substantially parallel inside surfaces of the magnetic yoke, and that the magnetic yoke is located on the free end of a rocker arm provided at the other end, and that the magnetic yoke embraces the coil which is fixed to the frame carrying the pivot of the rocker arm. The flat magnet may be pill-shaped, i.e., have the shape of a cylinder of which the height is less than the diameter. Preferably a plurality of pill-shaped flat magnets are secured to one of the two inside surfaces of the yoke substantially parallel to one another, the magnet being made of samarium and cobalt of a quantitative ratio of 1 : 5.

The magnet materials of the invention are magnetically substantially stronger than all those used hitherto for such electric motors. However, they are so hard and brittle that it is practically impossible to subject them to any shaping operation. If for example the said alloy of samarium and cobalt is sold in the shape of cylindrical rods or pills, then only pill-shaped flat magnets may be used which are, of course, not adapted to the shape of the coil of a normal electric motor. Since such adaptation constitutes a necessary requirement of a motor for use in the field of chronometer technology, it would appear at first sight that the invention could not bring any technical progress, but leading to serious disadvantages. This does not however apply. It has been found that the disadvantages which arise due to the lack of adaptability of the new material, are more than compensated by the considerable increase in the magnetic field produced, so that the limits of technical and economic possibility are considerably enlarged. Thus, the invention provides a stronger motor with greater efficiency than one of the same size using former techniques, or alternatively the production cost, the motor is lowered if a similar output is required.

Further details of the invention are described below by way of an example with reference to the accompanying drawings, in which.

Figure 1:
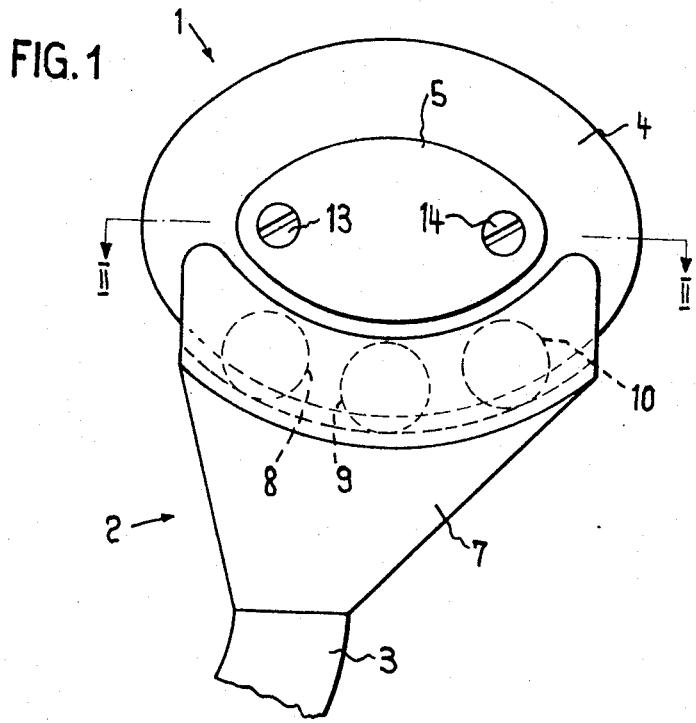
FIG. 1 shows an elevation of an electric motor in accordance with the invention, located on the free end of a rocker arm of a two armed mechanical resonator.
Figure 2:
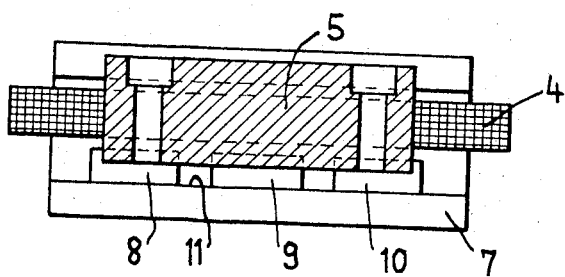
FIG. 2 is a cross-section through the motor of FIG. 1 taken on the chain-dotted line II—II and FIG. 3 is a side view of the motor shown in FIG. 1.
Figure 3:
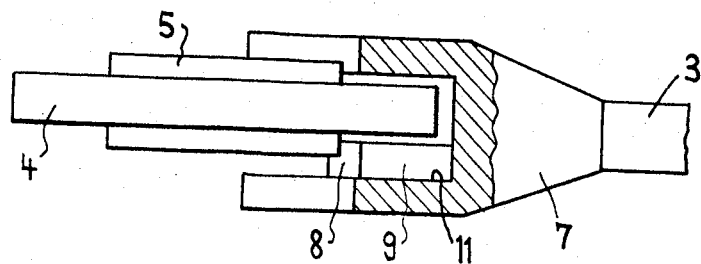

The motor shown as an example consists substantially of a coil 1 and a magnetic system 2. The magnetic system is fixed to the free end of a rocker arm 3 clamped at one end.

A coil 1 is composed of turns of wire 4 and a coil body 5, which supports the coil. In the coil body 5 there may be located the individual components of an electric circuit which together with the coil, the magnetic system and a rocker arm form an electro-mechanical oscillator.

The magnetic system 2 consists of a magnet yoke 7 of U-shaped cross-section and three circular cylindrical, pill-shaped axially magnetised flat magnets 8, 9 and 10, which are located on one inside surface 11 of two inside surfaces of the magnetic yoke the surfaces being parallel to one another. The magnetic yoke embraces the windings of the coil 4 which in the region of the flat magnets is intersected at rigth angles by the lines of force of the flat magnets.

The magnetic yoke 7 consists of a relatively cheap, ferro-magnetic material, of high permeability and with high magnetic induction. The three flat magnets 8, 9 and 10 are made of a samarium cobalt alloy, in which the molecular quantitative ratio between samarium and cobalt is 1 : 5. This alloy has very high coercive force and magnetic remanence, and forms very permanent magnets. Accordingly the magnetic induction produced by the flat magnets in the electro-motively effective region of the coil 4 is also high.

Hitherto in corresponding electric motors the inside surface 11 of the magnetic yoke 7 was completely lined with a bar magnet of a platinum-cobalt alloy and so the electro-motively effective region of the coil 4 was kept as large as possible. However, in view of the pill shape of the flat magnets 8, 9 and 10 the electro-motively effective region of coil 4 is obviously smaller than in the case of the total covering of the inside surface 11. The material selected for the flat magnets, however, provides a substantially stronger magnetic induction in the remaining electromotively effective region of the coil, so that the motor of the invention is substantially more powerful than hitherto known motors of equal overall volume.

When the winding 4 is traversed by electric current, a force is produced normal to the windings of the coil between it and the yoke 7. The winding 4 is supported on the coil core 5, which is fixed to a base plate, not shown in detail, by means of two screws 13 and 14.

The rocker arm 3 has belongs to a resonator which is provided with a second rocker arm arranged symmetrically to the one shown. This second rocker arm carries on its free end a magnetic system similar to the magnetic system 2, which embraces the top part of the coil 4, i.e., the one not covered by the yoke 7. When current traverses the coil 1 the magnetic system 2 and the magnetic system (not shown) of the second rocker arm of the resonator are subject to opposite forces.

What we claim is:

1. In an electro-dynamic motor for use in the field of chronometer technology and which includes a coil and at least one magnetic system disposed for movement relative to one another with the lines of force of the magnetic system intersecting the coil substantially at right angles to the direction of the movement, the improvement which comprises providing said magnetic system in the form of a plurality of permanent magnets each having the shape of a flattened cylinder compounded of an element selected from the group consisting essentially of rare earths and cobalt, said magnets being disposed proximate one another to one side of and proximate one face of the coil along a line conforming to an external contour of the coil, the arrangement being such as to permit the replacement of a single permanent magnet compounded of a material more readily formable but exhibiting lower coercivity.

2. An electro-dynamic motor according to claim 1 wherein the flat magnets are composed of samarium and cobalt.

3. An electro-dynamic motor according to claim 2, wherein the flat magnets are composed of one mol part samarium and five mol parts cobalt.

4. An electro-dynamic oscillating motor according to claim 1 wherein said means comprises an arm mounted at one end for oscillating movement and the magnetic system comprising a magnetic yoke of ferro-magnetic material of U-shaped cross-section mounted on the free end of said arm and comprising a group of magnets being located on one of two inside surfaces of the magnetic yoke which are parallel to one another, and said magnetic yoke straddling the coil, which is fixed.

5. An electro-dynamic motor according to claim 1, wherein said coil has substantially elliptical shape, at least one group of magnets being disposed along a longitudinal side of the coil.

6. An electro-dynamic motor for use in the field of chronometer technology comprising a coil and at least one magnetic system including at least one group of permanent magnets of flat cylindrical shape, means disposing said coil and magnetic system for movement relative to one another with the lines of force of the permanent magnets intersecting the coil substantially at right angles to the direction of the said movement, said magnets being composed of elements selected from the group consisting essentially of rare earths and cobalt, said group of magnets extending along one side of said coil substantially parallel to the windings of the coil for simultaneous interaction of each magnet of the group in similar flux linkage with said coil and in parallel disposition in the magnetic path of said magnetic system.

7. An electro-dynamic mol or according to claim 6 wherein the flat magnets are composed of samarium and cobalt.

8. An electro-dynamic motor according to claim 7, wherein the flat magnets are composed of one mol part samarium and five mol parts cobalt.

9. An electro-dynamic oscillating motor according to claim 6 wherein said means comprises an arm mounted at one end for oscillating movement and the magnetic system comprising a magnetic yoke of ferro-magnetic material of U-shaped cross-section mounted on the free end of said arm and comprising a group of magnets being located on one of two inside surfaces of the magnetic yoke which are parallel to one another, and said magnetic yoke straddling the coil, which is fixed.

10. An electro-dynamic motor according to claim 6, wherein said coil has substantially elliptical shape, at least one group of magnets being disposed along a longitudinal side of the coil.

* * * * *